United States Patent
Cantu (10) Patent No.: US 10,645,914 B2
(45) Date of Patent: May 12, 2020

(54) FLY ROD AND REEL HOLDER (71) Applicant: Jose F. Cantu, Edmonds, WA (US)

(72) Inventor: Jose F. Cantu, Edmonds, WA (US)

(*) Notice: Subject to any disclaimer, the term of this patent is extended or adjusted under 35 U.S.C. 154(b) by 330 days.

(21) Appl. No.: 15/605,627

(22) Filed: May 25, 2017

(65) Prior Publication Data

US 2018/0338482 A1 Nov. 29, 2018

(51) Int. Cl.
*A01K 97/10* (2006.01)
*B63B 35/14* (2006.01)

(52) U.S. Cl.
CPC .............. *A01K 97/10* (2013.01); *B63B 35/14* (2013.01)

(58) Field of Classification Search
CPC ....................................................... A01K 97/10
USPC ........................................................... 43/21.2
See application file for complete search history.

(56) References Cited

U.S. PATENT DOCUMENTS

| | | | | |
|---|---|---|---|---|
| 2,592,688 A * | 4/1952 | Halfpap | ................. | A01K 97/10 224/248 |
| 2,735,596 A * | 2/1956 | Smedley et al. | ........ | A01K 97/10 224/242 |
| 2,742,210 A * | 4/1956 | Bortz | ..................... | A01K 97/10 224/242 |
| 2,969,899 A * | 1/1961 | Brooks | .................. | A01K 97/10 224/581 |
| 2,971,735 A * | 2/1961 | Johnson | ................. | A01K 97/10 248/533 |
| 2,988,311 A * | 6/1961 | Bow | ...................... | A01K 97/10 248/514 |
| 4,587,757 A * | 5/1986 | Lirette | ................... | A01K 97/00 224/200 |
| 5,488,798 A * | 2/1996 | Beachel | ................. | A01K 97/10 248/530 |
| 5,915,942 A * | 6/1999 | Ratliffe | .................. | A01K 97/10 224/251 |
| 6,591,542 B1 * | 7/2003 | Jordan | ................... | A01K 97/10 224/922 |
| 6,725,798 B1 * | 4/2004 | Hill | ......................... | B63B 1/121 114/347 |
| 6,755,145 B2 * | 6/2004 | Bolebruch | ............. | B63B 25/002 114/347 |
| 6,964,243 B1 * | 11/2005 | Thompson | .............. | B63B 35/71 114/347 |
| 7,004,100 B1 * | 2/2006 | Rard | ...................... | A01K 97/08 114/347 |
| 7,146,927 B1 * | 12/2006 | Wright | ................... | A01K 97/06 114/364 |
| 9,389,010 B1 * | 7/2016 | Booker, Sr. | .............. | B62B 3/02 |
| 9,485,978 B1 * | 11/2016 | Allen, Jr. | .............. | F16M 13/022 |
| 9,586,657 B1 * | 3/2017 | Dykes | .................... | A01K 97/10 |
| 9,643,696 B1 * | 5/2017 | Lockhart | ................. | B63B 35/85 |
| 9,924,785 B1 * | 3/2018 | Gilmore | .................. | A45F 5/021 |
| 10,034,468 B1 * | 7/2018 | Pitts | ........................ | A01K 97/10 |

(Continued)

FOREIGN PATENT DOCUMENTS

| | | | | |
|---|---|---|---|---|
| CA | 2260625 A1 * | 8/1999 | ............ | A01K 97/10 |
| GB | 210922 A * | 2/1924 | ............ | A01K 97/10 |

(Continued)

*Primary Examiner* — Christopher P Ellis (74) *Attorney, Agent, or Firm* — Morrison & Foerster LLP (57) ABSTRACT

The present application describes an improved apparatus to hold and secure fly fishing equipment while not being directly handled by the operator.

8 Claims, 6 Drawing Sheets

(56) References Cited

U.S. PATENT DOCUMENTS

| | | | |
|---|---|---|---|
| 2007/0028504 A1* | 2/2007 | Cameron | A01K 97/10 43/21.2 |
| 2009/0071058 A1* | 3/2009 | Chavez | A01K 97/06 43/54.1 |
| 2011/0154714 A1* | 6/2011 | Rieck | A01K 97/10 43/21.2 |
| 2012/0067911 A1* | 3/2012 | Norment | A01K 97/10 220/735 |
| 2012/0073488 A1* | 3/2012 | Temple | A01K 97/10 114/267 |
| 2013/0333268 A1* | 12/2013 | Henry, Jr. | A01K 97/10 43/4.5 |
| 2014/0183240 A1* | 7/2014 | Silverman | A45F 5/00 224/628 |
| 2015/0230447 A1* | 8/2015 | Keossian | A01K 97/125 43/17 |
| 2015/0296763 A1* | 10/2015 | Sanders | A01K 97/10 224/200 |
| 2017/0015392 A1* | 1/2017 | Johnson | B63H 16/04 |
| 2017/0118969 A1* | 5/2017 | Grillo | A01K 97/10 |
| 2019/0008130 A1* | 1/2019 | Dintheer | A01K 97/10 |
| 2019/0031302 A1* | 1/2019 | Nutz | B63B 35/71 |
| 2019/0231054 A1* | 8/2019 | Walter | A01K 97/10 |
| 2019/0269119 A1* | 9/2019 | Vandamia | A01K 97/10 |

FOREIGN PATENT DOCUMENTS

| | | | | |
|---|---|---|---|---|
| WO | WO-8502091 A1 * | 5/1985 | | A01K 97/10 |
| WO | WO-2004036980 A2 * | 5/2004 | | A01K 97/06 |

* cited by examiner

FLY ROD AND REEL HOLDER

BACKGROUND

1. Field

The present disclosure relates generally to the field of fishing and devices adapted to secure fishing equipment, and more specifically to systems adapted to secure fly fishing reels and rods during operation of an aquatic vessel.

2. Description of Related Art

Current methods of securing fishing equipment, such as fly rods and reels, are primarily directed to the securement of fishing equipment to the structure of a boat. For example, the system may comprise a base attached to a portion of the boat and a tube-like system attached to the base that holds the fishing rod and reel while not being handled by the operator.

These current securement devices do not allow the fisherman to quickly access the rod and reel if, for example, the fisherman is operating the boat while simultaneously trolling, or drawing a baited line through the water. If a fish bites the fly at the end of the line while trolling, the fish may escape before the fisherman is able to reach for and operate his fly rod and reel. Moreover, current securement devices often do not account for the required movement of oars while operating an aquatic vessel, such as a personal pontoon boat. If the fly rod is not positioned sufficiently clear of the oars, the fisherman may accidentally knock his equipment into the lake with the oars while moving the boat. As a result, the fisherman may lose both very expensive equipment and his opportunity to fish for that day.

Thus, there is a need for a fishing equipment securement system that allows a boat-bound fisherman to quickly access and operate his rod and reel when needed, while holding the equipment clear of oars or other propelling devices during boat transit.

BRIEF SUMMARY

The present application describes an improved apparatus to hold and secure fly fishing equipment while not being directly handled by the operator.

The present disclosure provides a fly rod and reel securement system for use with a single-occupant pontoon boat, the system comprising a vessel having one or more side walls forming a chamber configured to hold a fly reel while said reel is attached to a fly rod; a substantially Y-shaped holder affixed to a first side wall of the one or more sidewalls, the holder configured to hold said fly rod while the reel is held in the chamber of the vessel; a securing member affixed to a second sidewall of the one or more sidewalls, the securing member configured to reversibly secure the vessel to an operator of the fly rod and reel. In a specific embodiment, the Y-shaped holder is affixed to the vessel in a position substantially opposite the securing member, the Y-shaped holder having a first member and a second member that intersect to form an opening, the opening oriented away from the vessel. In a further embodiment, the Y-shaped holder extends beyond a sidewall of the one or more sidewalls.

The system may optionally include a support bar, separate from the vessel, the support bar configured to be affixed across the front end of a single-occupant pontoon boat. In a further embodiment, the system includes a first pole configured to support a first side of the bar; and a second pole configured to support a second side of the bar. The system may also include a first clamp attached to the first pole, the first clamp configured to secure the first pole to the boat; and a second clamp attached to the second pole, the second clamp configured to secure the second pole to the boat. In a further specific embodiment, the first pole is attached to the first clamp by interlocking threading and the second pole is attached to the second clamp by interlocking threading. In a further embodiment, the first pole and the second pole each comprise a hook at the top configured to support the bar.

DESCRIPTION OF THE FIGURES

FIGS. 3A and 3B depict a view of the clamps used to attach the poles to a frame of a pontoon boat.

DETAILED DESCRIPTION

The following description is presented to enable a person of ordinary skill in the art to make and use the various embodiments. Descriptions of specific systems, devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

In a preferred embodiment, the boat for use with the presently described system is a personal pontoon boat used for fishing. In an exemplary embodiment, the pontoon boat comprises two banana-shaped inflatable pontoons and a frame attached to the pontoons. This exemplary frame extends from approximately the back third to the front third of the top-inner sides of the pontoons and comprises foot rests at the front of the boat. The exemplary boat further comprises a single-occupant seat and wire mesh basket affixed to the top of the frame, configured such that the seat height is situated at or slightly above the top of the pontoons. The seat is preferably positioned between the pontoons, in the middle of the length of the boat with the frame extending past the seat toward the front of the boat. Exemplary pontoon boats are sold by retailers including Classic Accessories™, Creek Company™, and Outcast™.

The present application describes an improved apparatus to hold and secure fly fishing equipment while not being directly handled by the operator.

Figure 1A:
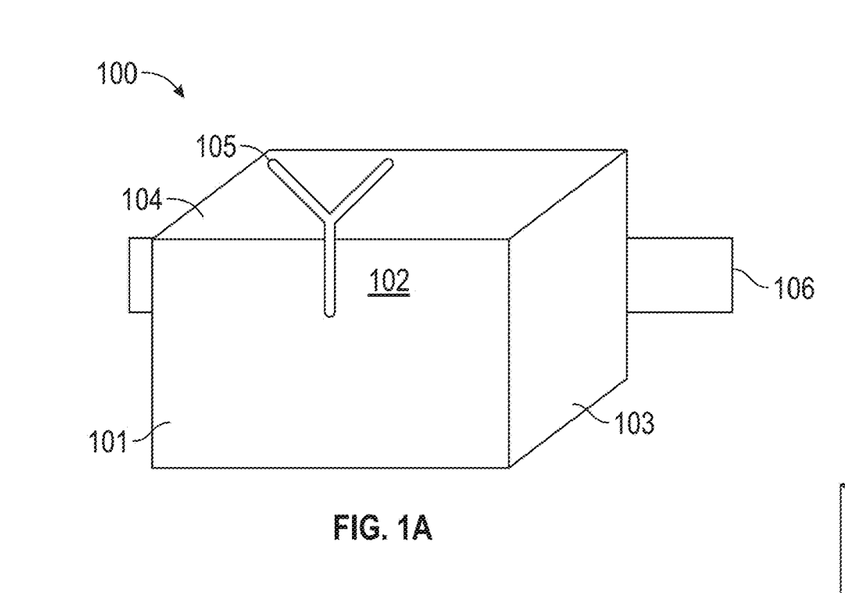
FIG. 1A depicts an exemplary embodiment of the front view of the fly rod and reel securement system vessel and attachments.
Figure 1B:
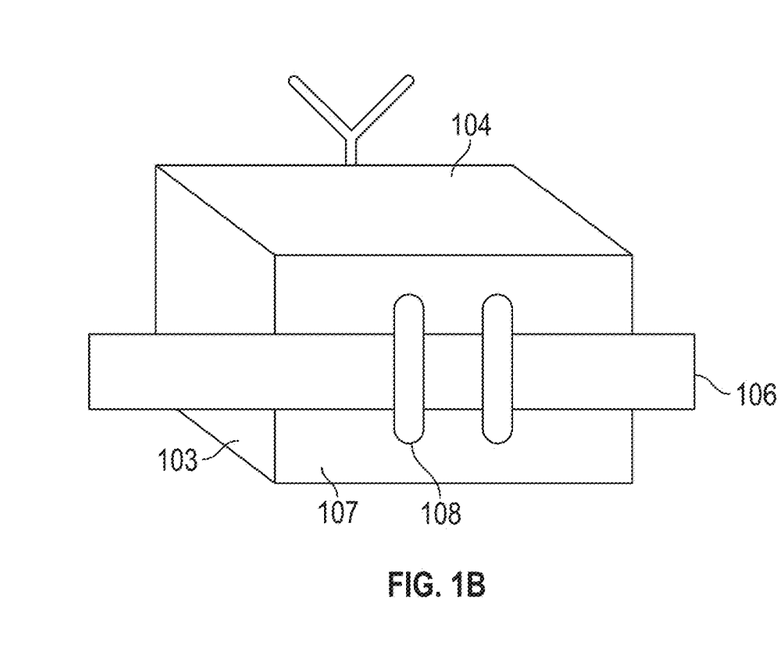
FIG. 1B depicts an exemplary embodiment of the back view of the fly rod and reel securement system vessel and attachments.
Figure 2:
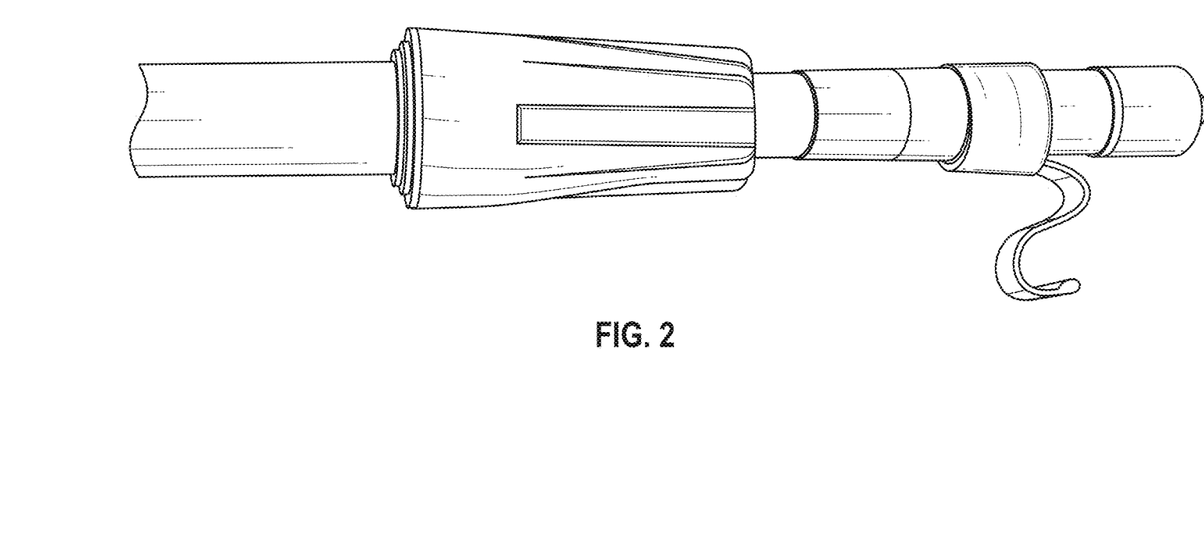
FIG. 2 depicts the top end of an exemplary pole used to hold the support bar in place.

In one embodiment the securement system comprises a vessel, comprising four side walls, and sufficiently deep to contain a fly reel. In one embodiment, the vessel has a closed bottom. In another embodiment, the vessel has a perforated bottom having a plurality of holes in the bottom of the vessel. The vessel may be in any shape known in the art, including, but not limited to, square, oval, circular, square-shaped, etc. An upright Y-shaped holder is affixed to one side of the vessel, configured to hold the fly rod in place while the rod end and reel are held within the vessel. The top of the Y-shaped piece may be any shape that comprises sides and an open top that can hold an article, including, but not limited to V, U, square, etc. The vessel is further configured to be reversibly attached to the operator of the fly rod and reel. In one embodiment, the vessel is configured to be attached to a strap, which can be wrapped around and fastened to the body of the fisherman during operation of the securement system. With reference to FIG. 1, the securement system comprises a vessel (100) comprising a front side (101), two sides (103), and an open top (104) There is a Y-shaped piece (105) affixed to front side (102) such that the top of the Y protrudes above the top edge of the vessel. FIG. 2 depicts a back view of the vessel, comprising an open top (104) and side (103), and further comprising a back side (107). Affixed to back side (107) is at least one strap holder (108) holding a strap (106).

The vessel (100) may be made out of any material. In some embodiments, the vessel is made out of plastic, metal, carbon fiber, resin, composite, or any common material known in the art. The Y-shaped piece (105) may likewise be made out of any material known in the art including, but not limited to, plastic, metal, carbon fiber, resin, composite, etc. The vessel and the Y-shaped piece may be manufactured as one singular item, or they may be attached after separate manufacture. In a preferred embodiment, the Y-shaped piece is attached in a vertical position with the opening of the Y facing upwards. The Y-shaped piece may be affixed to the vessel permanently (irreversibly) or reversibly. The Y-shaped piece may be affixed to the vessel using any method known in the art, including, but not limited to, gluing, welding, sewing, taping, velcroing, tying, bolting, nailing, pinning, stapling, etc.

When referring to dimensions of the vessel, the width may refer to either or both of the width of the vessel when viewed from the front or the side and the height of the vessel may refer to how high the vessel rises if placed on a level surface. In a preferred embodiment, the vessel is less than 16 inches wide, less than 12 inches wide, less than 10 inches wide, less than 8 inches wide, or less than 6 inches wide at its widest point. In some embodiments, the vessel is at least 4 inches wide, at least 5 inches wide, at least 6 inches wide, or at least 7 inches wide at its widest point. In a further embodiment, the vessel is less than 12 inches high, less than 10 inches high, less than 8 inches high, or less than 6 inches high at its highest point, not including the Y-shaped piece.

The strap holder (108) may be a slit cut out from the back side of the vessel, through which a strap is threaded or the strap holder may be an additional device affixed to the back side of the vessel. In some embodiments, the vessel comprises a singular strap holder and in other embodiments, the vessel comprises a plurality of strap holders. In some embodiments, the strap holder is a loop affixed to the back side of the vessel configured to hold the strap securely to the vessel. In an embodiment where the strap holder is a slit cut out from the back side of the vessel, the vessel comprises a plurality of slits, such that the strap enters the vessel through one slit and exits through another. The strap holder (108) may be made out of any material known in in the art including, but not limited to, plastic, metal, carbon fiber, resin, composite, etc. The strap (106) may be made out of any material known in the art, including but not limited to, leather, nylon, cotton, wool, polyester, rayon, plastic, elastic, or any other material. The strap may further comprise a clasp or buckle for fastening the strap around the operator. In a preferred embodiment, the strap is pliant enough to conform to the shape of the operator during use of the fly rod securement system.

In another embodiment, the system further comprises a horizontal support bar affixed to a boat such that the fly rod rests on the bar while the opposing end of the rod and the reel are being held within the vessel. The support bar preferably extends across the front of the boat, held above the boat frame by the vertically positioned poles, such that the fly rod is held above the surface of the boat and the water. The operator preferably faces the support bar while seated with the securement system vessel containing the rod and reel. In a preferred embodiment, the support bar is affixed at least as high as the vessel when the securement system is attached to an operator sitting in the boat. The support bar may be made out of any material known in the art. Exemplary materials include metal (such as aluminum, steel, or other metals), plastic, carbon fiber, wood, resin, composite, etc.

Figure 3A:
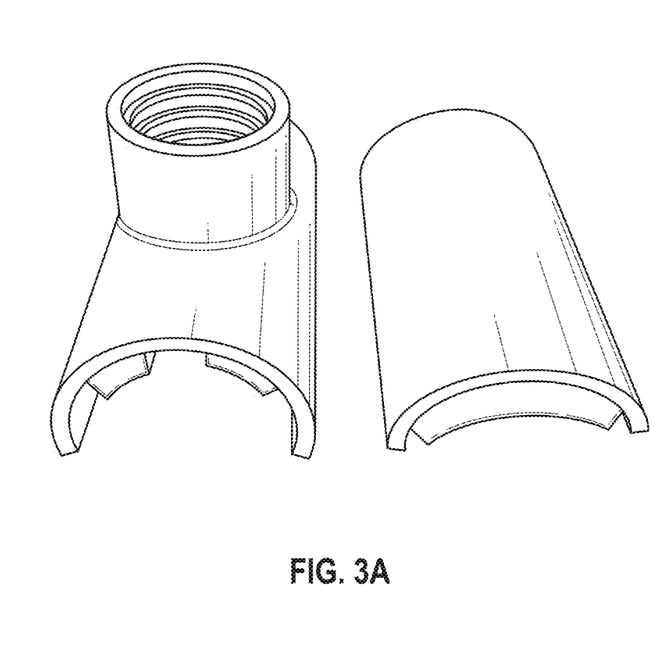
FIG. 3A depicts the clamp pieces separately.
Figure 3B:
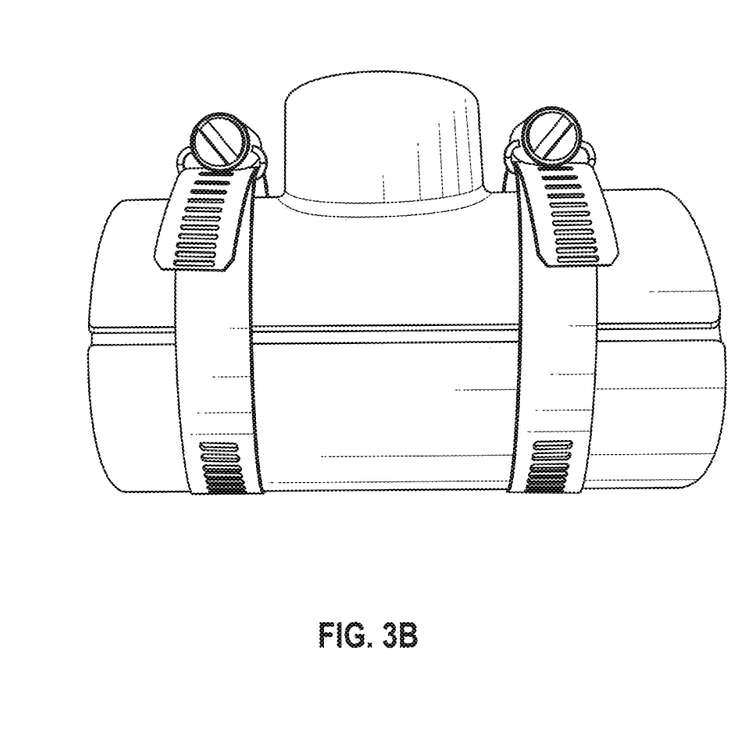
FIG. 3B depicts the clamp pieces secured together, as they would be secured around the frame of a boat.

With reference to FIGS. 2 and 3A-3B, the support bar is attached to the frame of the pontoon boat using clamps and poles affixed to the boat frame and hooks affixed to the top end of the poles. The clamps are optionally padded on the interior as to not damage the frame of the boat. The clamps, poles, and hooks may be made out of any suitable material known in the art, for example, plastic, metal, carbon fiber, resin, composite, etc. In a preferred embodiment, the poles are adjustable by length, for example, via a screw-tightened spring-loaded action. The poles may further be threaded at one end, for securing to the clamps. An exemplary adjustable aluminum bar is available from the brand Twist-Lok®. The clamps and poles may be permanently or reversibly affixed to the boat.

FIG. 2 depicts an exemplary pole comprising a hook at the top end for holding the support bar. In this fashion, the support bar rests on the hooks at the top of the pole and is secure while the boat is in motion, but is also easily removable.

FIGS. 3A and 3B depict an exemplary clamp used to secure the pole to the frame of the boat. FIG. 3A shows the clamp pieces separately. FIG. 3B shows the clamps secured together, as they would be secured around a frame of a pontoon boat. In a preferred embodiment, the clamp is in at least two pieces, one of which comprises a pole-securing mechanism (shown in FIG. 3A as a round tube protruding up from the clamp). The second piece is designed to be placed opposite the first piece, around the frame of a boat. The first and second clamp pieces are secured around the boat frame using a fastening device that wraps around and connects the two clamp pieces together. The fastening device for securing the two clamp pieces together may be made out of any suitable material known in the art, for example, plastic, metal, carbon fiber, resin, composite, etc. During operation of the present apparatus, the clamp is secured around the frame of the boat, and the poles are subsequently inserted into the pole-securing mechanism on the clamps, thereby connecting the poles to the boat frame. In a preferred embodiment, the poles are positioned in an upright, vertical position after insertion into the clamp pole-securing mechanisms, with the hooks positioned at the top end of the poles for holding the support bar.

Figure 6A:
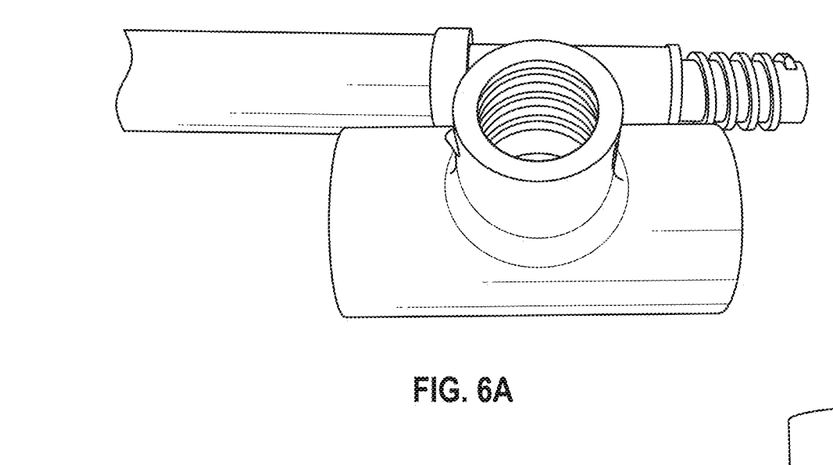
FIG. 6A and FIG. 6B depict an exemplary embodiment wherein a pole comprises a threaded end configured for attachment to a clamp. In this exemplary embodiment, the clamp also comprises a threaded pole-securing mechanism which the threaded end of the pole screws into.
Figure 6B:
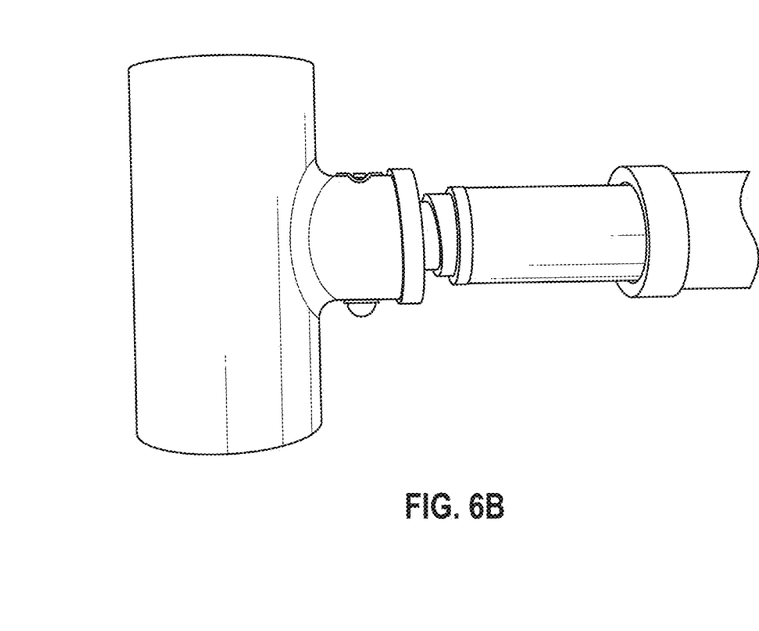

As depicted in FIG. 6A and FIG. 6B, in a preferred embodiment, the pole-securing mechanism in the clamp is threaded such that a threaded pole may be screwed into the securing mechanism, providing a more secure and stabile fit.

Figure 4:
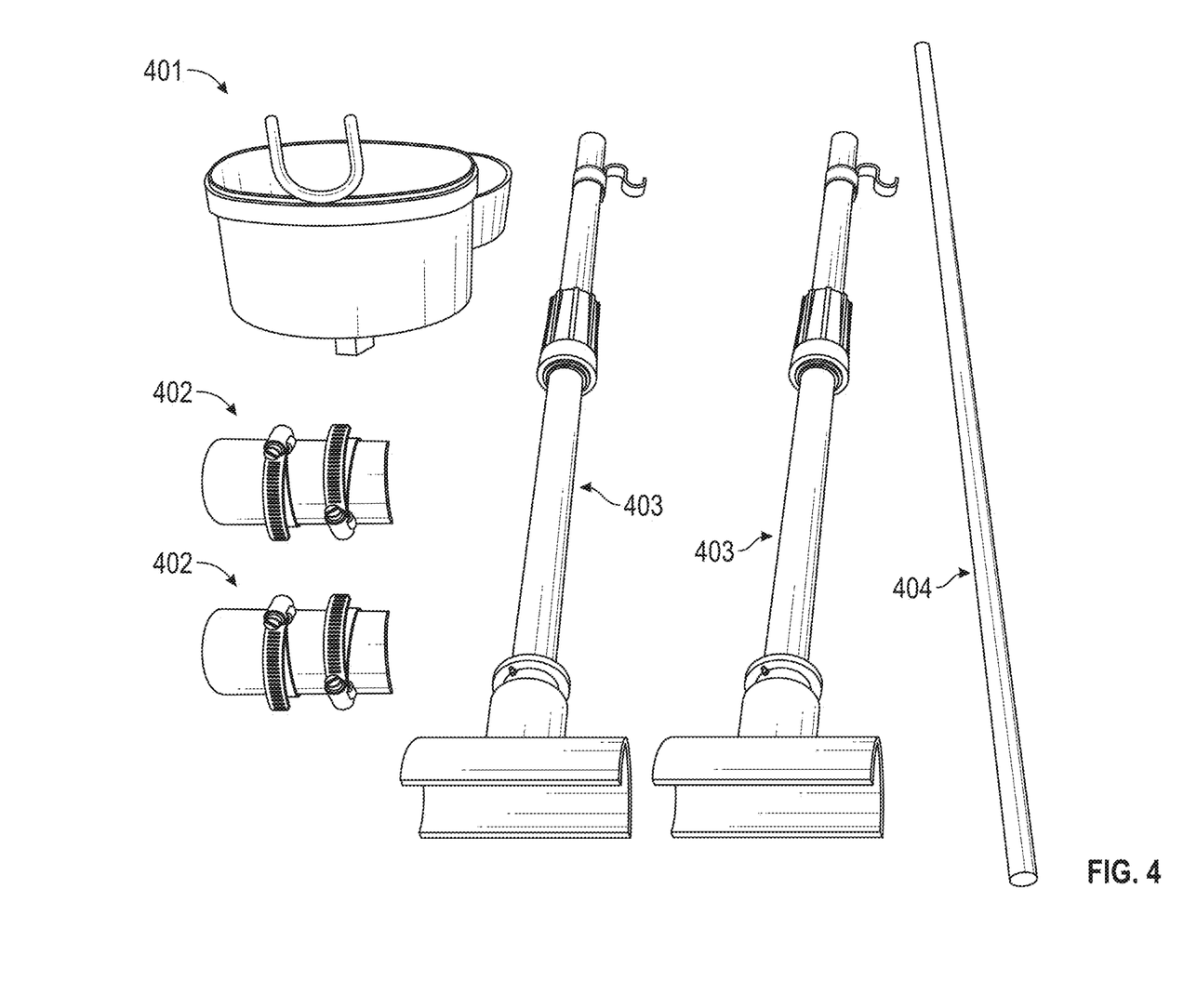
FIG. 4 depicts pieces of the system including the vessel, clamps, poles, and support bar.
Figure 5:
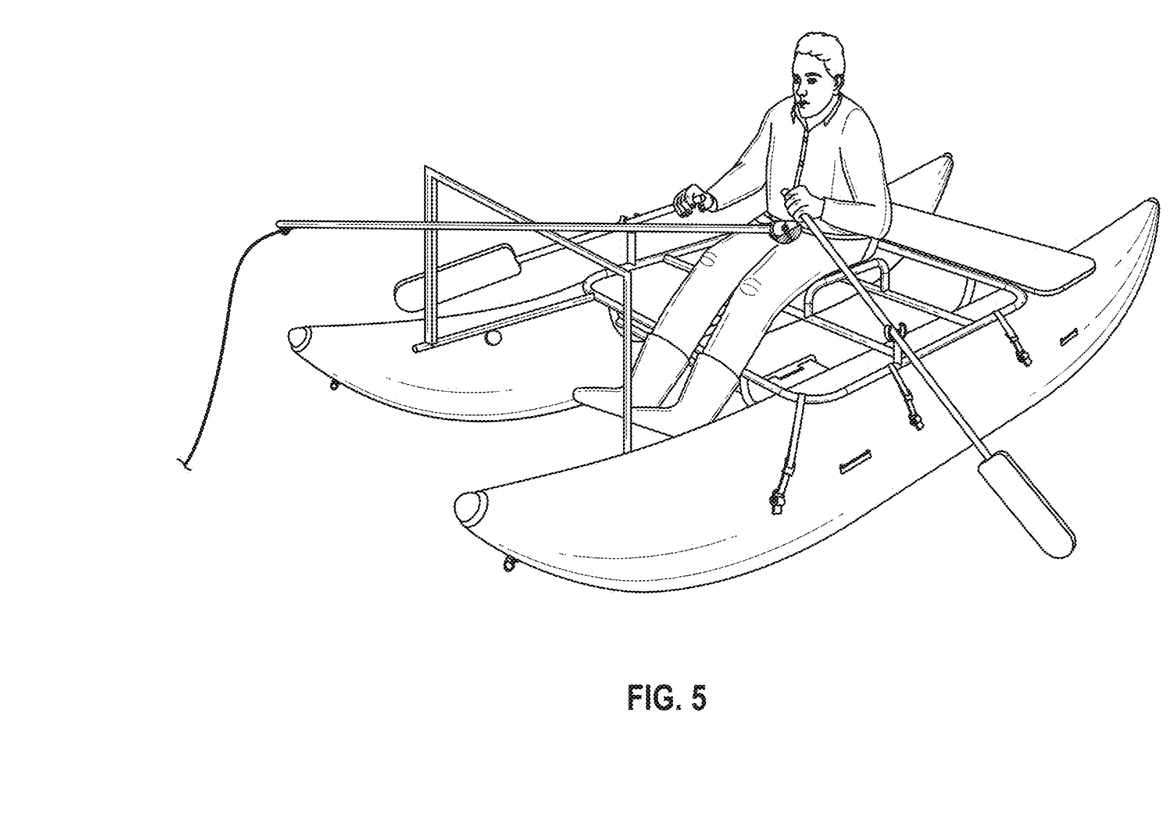
FIG. 5 depicts one embodiment of the assembled system in use.

FIG. 4 depicts exemplary components of the securement system. Item 401 depicts a view of the vessel, including the Y-shaped piece (shown in the front) and the strap (shown behind). Item 402 represents the clamps and fastening devices for securing the clamp pieces together. Item 403 represents an exemplary embodiment of the poles utilized to hold the support bar, when secured to the boat frame using the clamps. Item 404 represents an exemplary support bar for use with the securement system described herein.

During operation of the securement system, the fly rod may rest upon the support bar, while the reel, attached to the rod end, rests within the vessel. The Y-shaped piece further supports and secures the rod. In such a fashion, the rod is not fastened directly to the boat and is quickly and easily removed from the securement apparatus by simply lifting the rod and reel up and out of the vessel and Y-shaped piece.

Additional components of the system may include a carrying case configured to hold each of the components of the system, thereby permitting the user to transport all pieces easily and conveniently. The carrying case may be hard-sided or soft-sided. The case may be empty on the inside, such as a bag wherein the components are merely placed inside the case, or the case may be lined with foam or other packing material to pad the components and prevent damage. The case may also contain separate compartments or clamps for holding each component. The case may be made out of any material. In some embodiments, the case is made out of plastic, metal, carbon fiber, resin, composite, canvas, polyester, cotton, or any common material known in the art.

What is claimed is:

1. A fly rod and reel securement system for use with a single-occupant pontoon boat, the system comprising:
   a vessel having one or more sidewalls forming a chamber configured to hold a fly reel while said reel is attached to a fly rod;
   a substantially Y-shaped holder affixed to a first sidewall of the one or more sidewalls, the holder configured to hold said fly rod while the reel is held in the chamber of the vessel;
   a securing member affixed to a second sidewall of the one or more sidewalls, the securing member configured to reversibly secure the vessel to an operator of the fly rod and reel.

2. The system of claim 1, further comprising a support bar, separate from the vessel, the support bar configured to be affixed across the front end of a single-occupant pontoon boat.

3. The system of claim 1, wherein:
   the Y-shaped holder is affixed to the vessel in a position substantially opposite the securing member,
   the Y-shaped holder having a first member and a second member that intersect to form an opening, the opening oriented away from the vessel.

4. The system of claim 2, the system further comprising:
   a first pole configured to support a first side of the bar; and
   a second pole configured to support a second side of the bar.

5. The system of claim 4, the system further comprising:
   a first clamp attached to the first pole, the first clamp configured to secure the first pole to the boat; and
   a second clamp attached to the second pole, the second clamp configured to secure the second pole to the boat.

6. The system of claim 5, wherein the first pole is attached to the first clamp by interlocking threading and the second pole is attached to the second clamp by interlocking threading.

7. The system of claim 4, wherein the first pole and the second pole each comprise a hook at the top configured to support the bar.

8. The system of claim 1, wherein the Y-shaped holder extends beyond the first sidewall.

* * * * *